United States Patent
Usai et al.

(10) Patent No.: US 11,652,358 B2
(45) Date of Patent: May 16, 2023

(54) UPS DEVICE FOR ELECTRIC POWER DISTRIBUTION INSTALLATIONS

(71) Applicant: ABB Schweiz AG, Baden (CH)

(72) Inventors: Roberto Usai, Treviolo (IT); Marco Testa, Romano di Lombardia (IT); Yaser Khalifa, New Paltz, NY (US); Andrea Bianco, Sesto San Giovanni (IT)

(73) Assignee: ABB SCHWEIZ AG, Baden (CH)

( * ) Notice: Subject to any disclaimer, the term of this patent is extended or adjusted under 35 U.S.C. 154(b) by 444 days.

(21) Appl. No.: 16/717,202

(22) Filed: Dec. 17, 2019

(65) Prior Publication Data

US 2020/0195039 A1 Jun. 18, 2020

(30) Foreign Application Priority Data

Dec. 17, 2018 (EP) .................................... 18213084

(51) Int. Cl.
*H02J 9/06* (2006.01)
*H02J 7/00* (2006.01)
*H02J 9/00* (2006.01)

(52) U.S. Cl.
CPC . *H02J 9/06* (2013.01); *H02J 7/00* (2013.01); *H02J 7/0029* (2013.01);
(Continued)

(58) Field of Classification Search
CPC .. H02J 9/06; H02J 7/345; H02J 7/0024; H02J 7/00; H02J 7/0029; H02J 7/00302; H02J 9/00; H02J 9/061
See application file for complete search history.

(56) References Cited

U.S. PATENT DOCUMENTS 6,507,168 B1 * 1/2003 Matsuda .................... H02J 7/34
320/103
2014/0077595 A1 * 3/2014 Kakuya ................. H02J 7/0024
307/24
(Continued)

FOREIGN PATENT DOCUMENTS

WO 2016063866 A1 4/2016

OTHER PUBLICATIONS

European Patent Office, Search Report issued in corresponding Application No. 18213084.9, dated Jun. 21, 2019, 4 pp.

*Primary Examiner* — Elim Ortiz
(74) *Attorney, Agent, or Firm* — Greenberg Traurig, LLP

(57) ABSTRACT

An UPS device for electric power distribution installations, the UPS device including: first electric terminals for electrical connection with an electric load to be fed by the UPS device; second electric terminals for electrical connection with a power supply source adapted to feed the UPS device; third electric terminals for electrical connection with a back-up unit adapted to feed the UPS device, when the power supply source is not available, the back-up unit having one or more replaceable batteries; a power conversion stage electrically connectable with the first, second and third electric terminals, the power conversion stage being adapted to receive a power supply voltage from the power supply source or a back-up voltage from the back-up unit, when the power supply source is not available, and being adapted to provide an adjustable load voltage to the electric load; and an interface stage to electrically couple or decouple the back-up unit with or from the power conversion stage. The interface stage includes a feeding circuit to temporary feed the controller during a transient time interval following a replacement of the batteries of the back-unit.

20 Claims, 6 Drawing Sheets

Figure 1:
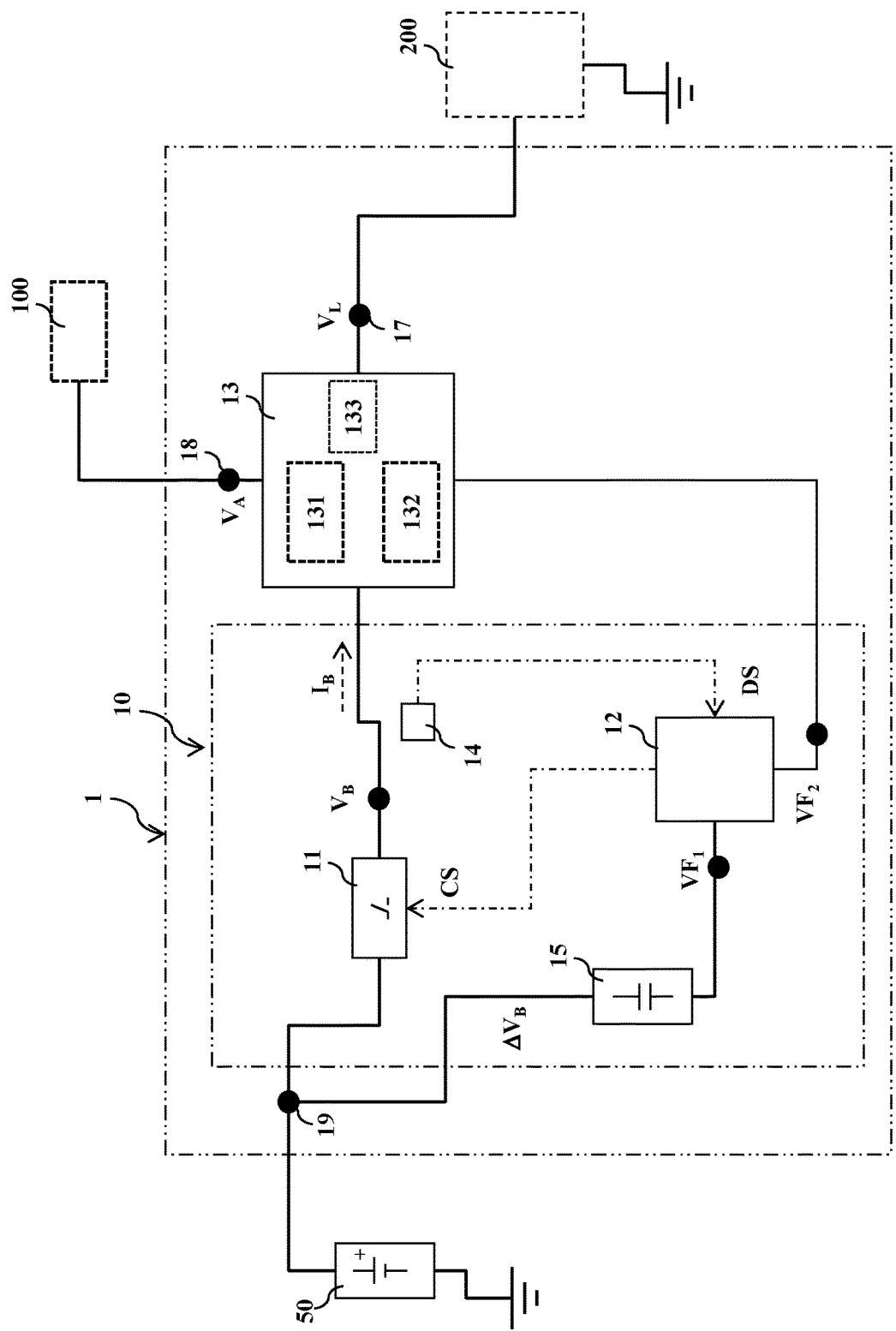

(52) U.S. Cl.
CPC .............. *H02J 7/00302* (2020.01); *H02J 9/00* (2013.01); *H02J 9/061* (2013.01)

(56) References Cited

U.S. PATENT DOCUMENTS

| | | | |
|---|---|---|---|
| 2015/0311748 A1* | 10/2015 | Watanabe | H02J 7/345 307/64 |
| 2019/0181677 A1* | 6/2019 | Toyoda | H02J 7/02 |
| 2019/0363569 A1* | 11/2019 | Toyoda | H02J 9/06 |

* cited by examiner

UPS DEVICE FOR ELECTRIC POWER DISTRIBUTION INSTALLATIONS

The present invention relates to an uninterruptible power supply (UPS) device for electric power distribution installations.

The UPS device of the invention is particularly suitable for use in outdoor medium voltage electric installations, for example in outdoor medium voltage switching apparatuses, such as outdoor medium voltage reclosers or other systems of similar type.

For the purposes of the present invention, the term "low voltage" identifies operating voltages lower than 1 kV AC and 1.5 kV DC whereas the term "medium voltage" (MV) identifies operating voltages higher than 1 kV AC and 1.5 kV DC up to tens of kV, e.g. up to 72 kV AC and 100 kV DC.

As is known, electric power distribution installations, particularly those of outdoor type, often comprise an UPS device to provide electric power to suitable components and devices that need to be fed for operating.

As an example, in an outdoor MV switching apparatus, an UPS device is typically arranged to feed components and devices included in the control cabinet.

In normal conditions, an UPS device is fed by a low voltage power supply source, e.g. the auxiliary power supply of a switching apparatus.

Typically, an UPS device is also electrically connected with a back-up unit including a set of removable batteries of rechargeable type and intended to feed the UPS device in emergency conditions, i.e. when the above-mentioned power supply source is not available.

Unfortunately, the back-up unit is capable of feeding the UPS device for relatively short time intervals only (e.g. some weeks) as its batteries are subject to discharge.

When the back-up voltage provided by the above-mentioned back-up unit is lower than an acceptable value, the UPS device disconnects from the corresponding electric loads and it is not fed anymore until the batteries of the back-up unit are suitably replaced or the above-mentioned power supply source becomes available.

A relevant drawback of commonly available UPS devices consists in that they generally offer undesired galvanic paths for discharging currents coming from the batteries of the back-up unit, even when they are not fed anymore.

Generally, this is due to the circumstance that traditional UPS devices are often designed to exploit a small portion of the electric power provided by the back-up unit to feed some internal circuits, particularly those designed to check the actual feeding voltage provided by the back-up unit.

Therefore, the batteries of the back-up unit keep on slightly discharging even if the UPS device is electrically disconnected from the corresponding electric loads and it does not operate.

This may constitute a critical issue as rechargeable batteries subject to prolonged discharge periods may fall in a so-called "deep discharge condition", in which they cannot be recharged anymore.

A further inconvenient of traditional UPS devices consists in that they do not carry out any substantial check of the actual charge level of the replacement batteries used to substitute discharged batteries of the back-up unit.

This problem is quite felt by operators as rechargeable batteries are currently used in maintenance interventions and the efficiency of these latter is often non-optimal due to deterioration with an intensive use. It is therefore desirable to know whether suitable replacements batteries have been used during a maintenance intervention.

It is an object of the present invention to provide an UPS device for electric power distribution installations, which allows solving or mitigating the above-mentioned problems.

More particularly, it is an object of the present invention to provide an UPS device designed in such a way to prevent a deep discharge of the batteries of a corresponding back-up unit.

A further object of the present invention is to provide an UPS device that allows a user to understand whether the replacement batteries used in a maintenance intervention on the back-up unit have an adequate level of charge to ensure a prolonged period of service to the UPS device.

Another object of the present invention is to provide an UPS device that can be easily manufactured at industrial level, at competitive costs.

In order to fulfil these aim and objects, the present invention provides an UPS device for electric power distribution installations according to the following claim 1 and the related dependent claims.

In further aspect, the present invention provides an electric power distribution installation according to the following claim 12 and the related dependent claims.

Figure 2:
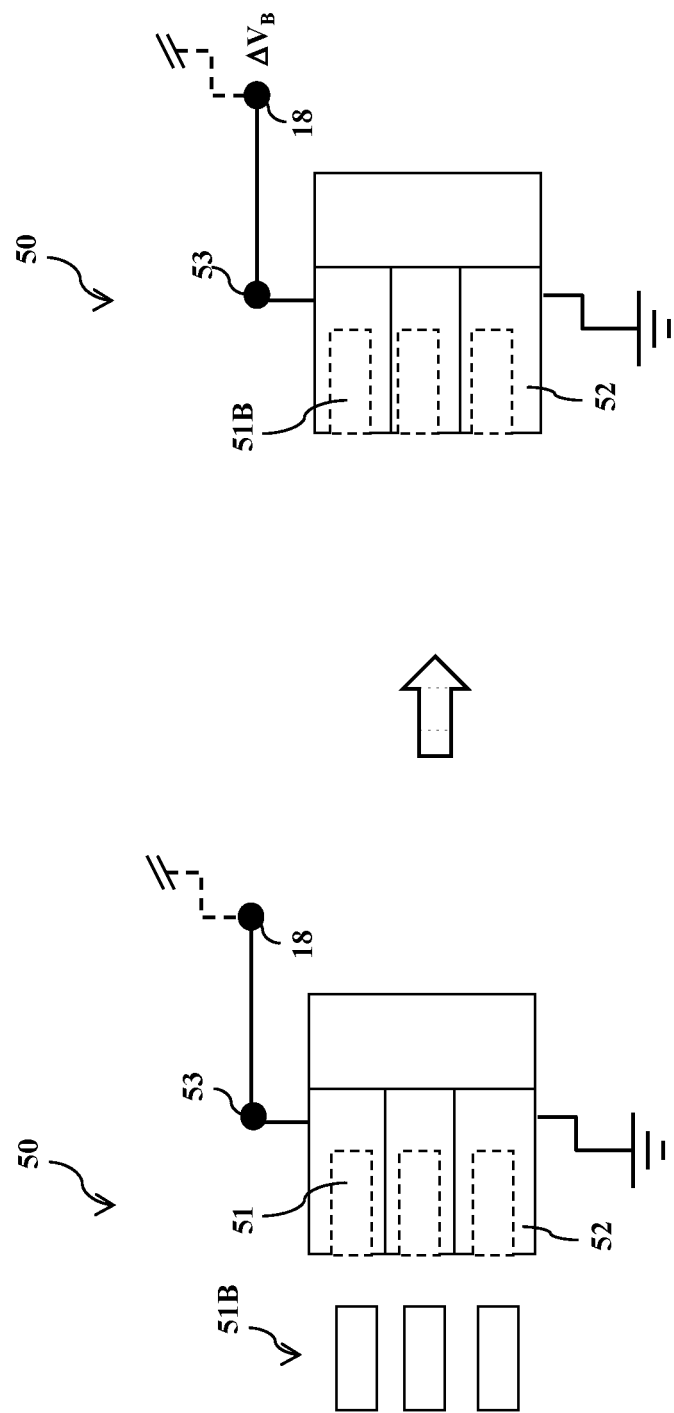
Figure 3:
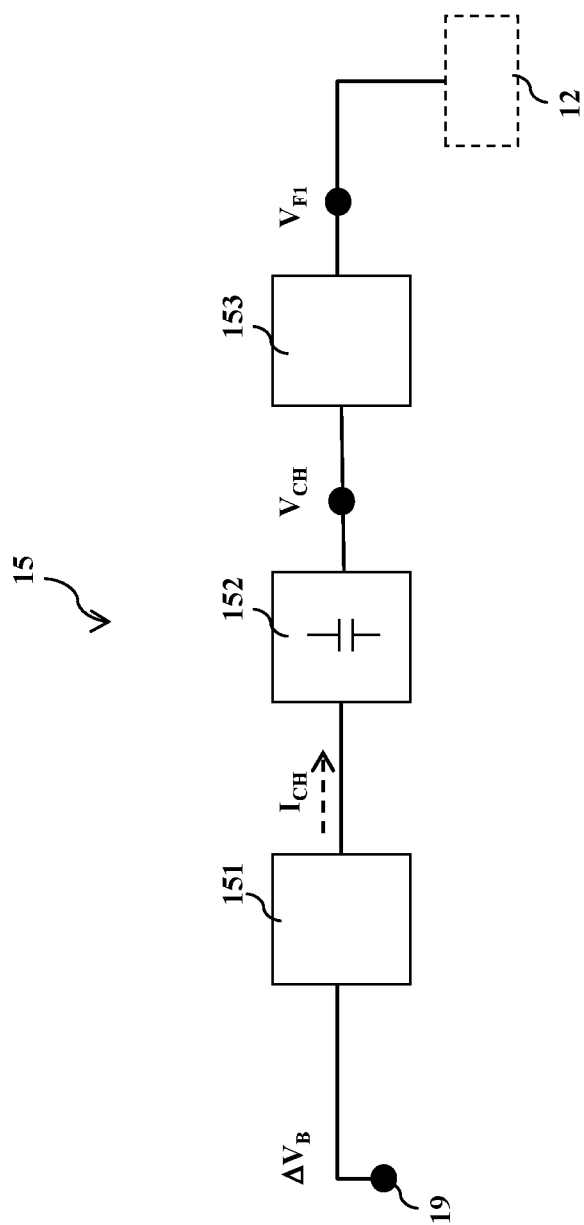
Figure 4:
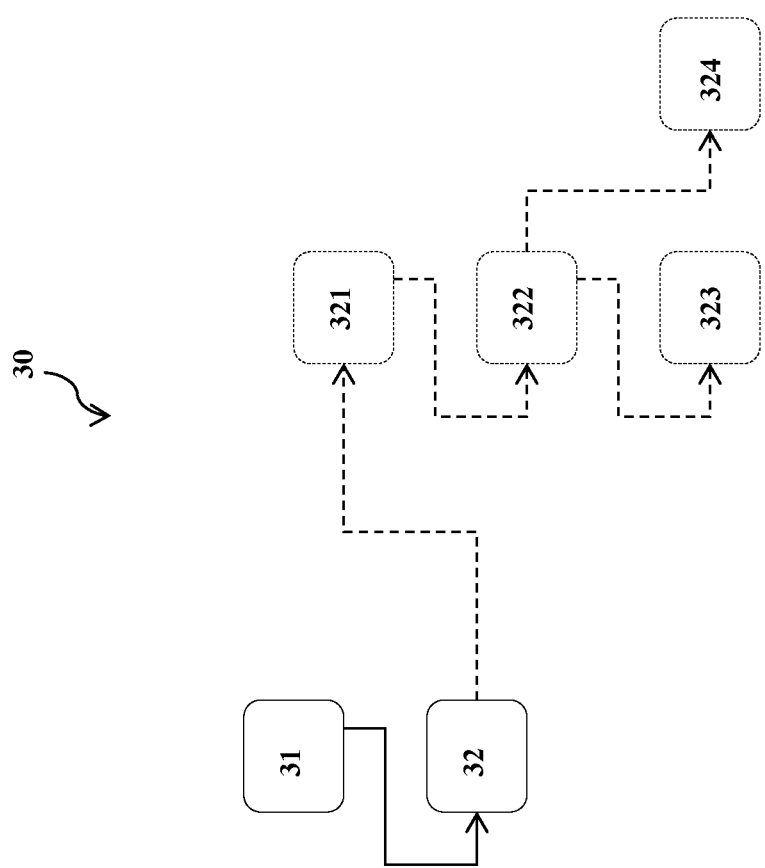
Figure 5:
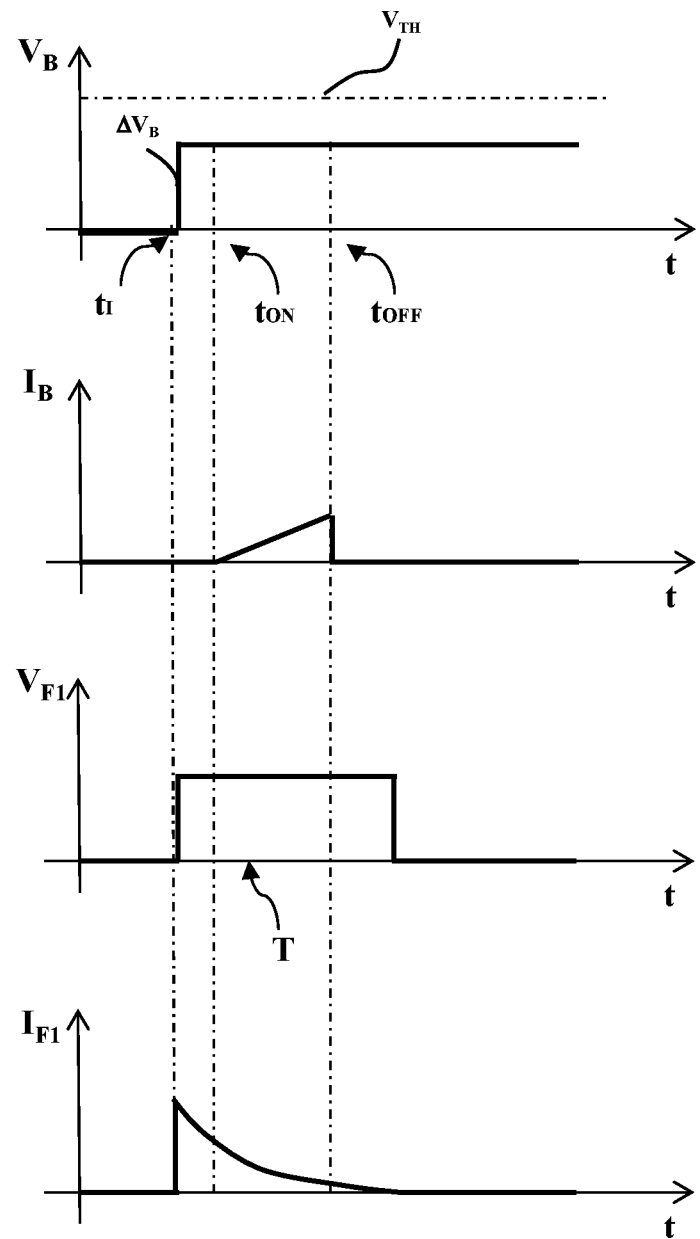
Figure 6:
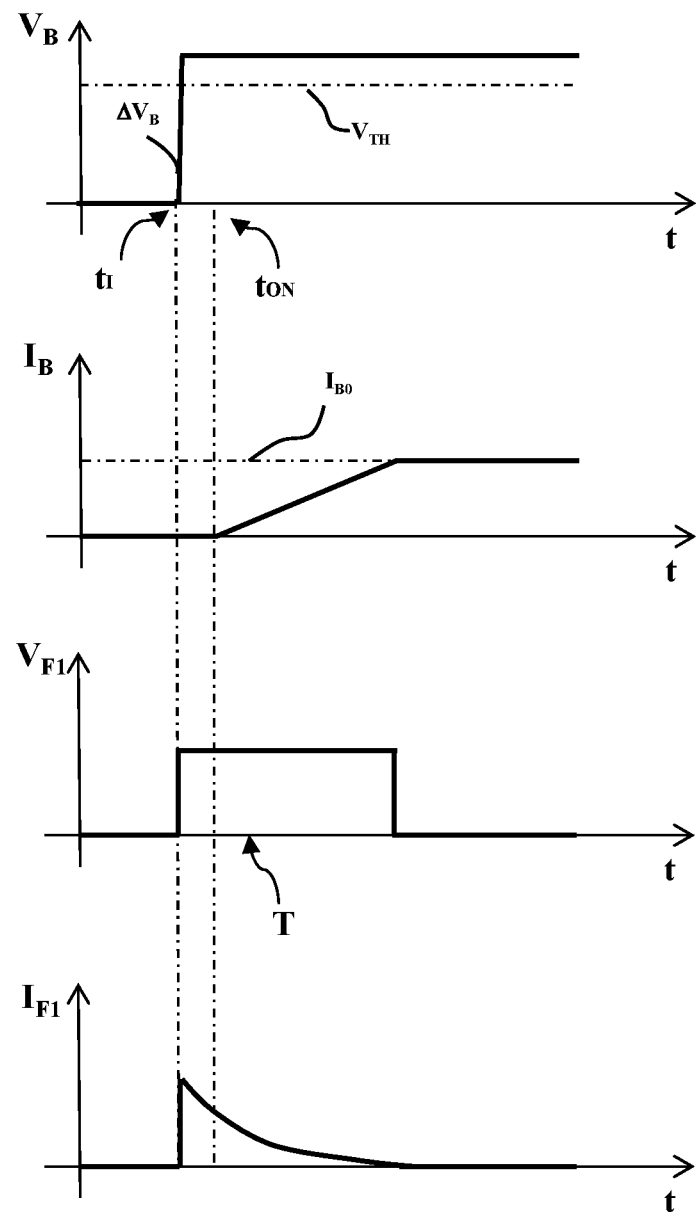

Characteristics and advantages of the invention will emerge from the description of preferred, but not exclusive, embodiments of the UPS device, according to the invention, non-limiting examples of which are provided in the attached drawings, wherein:

FIG. 1 is block scheme showing an embodiment of the UPS device, according to invention;

FIG. 2 schematically shows a maintenance intervention on a back-up unit operatively associated with the UPS device, according to invention;

FIG. 3 schematically shows a feeding circuit to feed a controller included in the UPS device, according to invention;

FIG. 4 schematically shows the operation of said controller when fed by said feeding circuit;

FIGS. 5-6 schematically show the behavior of some electric quantities in the UPS device, according to invention.

Referring to the cited figures, the present invention relates to an UPS device 1 for electric power distribution installations that are preferably of MV type.

Such installations may include switching apparatuses (e.g. reclosers, circuit breakers, contactors, disconnectors, and so forth), switchboards, motors and so on.

In general, the UPS device 1 is adapted to feed at least an electric load 200 and it conveniently comprises first electric terminals 19 for electrical connection with said electric loads.

As an example, in an outdoor MV switching device, an electric load 200 may comprise a protection relay, a radio transmitter device, a capacitor bank charger and a power and control device for driving the actuator of the switching device.

In general, the one or more electric loads 200 may be of any known type, according to the needs.

In the following, they will be described in relation to the aspects relevant to the invention only, for the sake of brevity.

The UPS device 1 is electrically coupleable with a power supply source 100.

The UPS device 1 is adapted to feed one or more electric loads 200 with electric power derived from the power supply source 100 in normal operative conditions, i.e. when said power supply source is available.

Conveniently, the UPS device 1 comprises second electric terminals 18 for electrical connection with the electric power source 100.

As an example, in an outdoor MV switching device, the power supply source 100 may be an auxiliary power supply unit capable of deriving low voltage electric power from a main AC electric power line.

In general, the power supply source 100 may be of any known type, according to the needs. In the following, it will be described in relation to the aspects relevant to the invention only, for the sake of brevity.

In order to ensure an uninterruptible feeding of the electric loads 200, the UPS device 1 is electrically couple-able with a back-up unit 50.

The UPS device 1 is adapted to feed an electric load 200 with electric power derived from the back-up unit 50 in emergency conditions, i.e. when the power supply source is not available for any reasons, e.g. due to fault conditions in said power supply source.

Conveniently, the UPS device 1 comprises third electric terminals 19 for electrical connection with the back-up unit 50.

The back-up unit 50 comprises a set of replaceable batteries 51.

Preferably, the batteries 51 are removably insertable in corresponding slots 52 of the back-up unit 50 and they can be suitably replaced during a maintenance intervention on said back-unit.

Preferably, when they are inserted in the corresponding slots 52, the batteries 51 are electrically connected in parallel with output electric terminals 53 of the back-unit 50, which are in turn intended to be electrically connected with the third electric terminals 19 of the UPS device 1.

As shown in FIG. 1, the back-up unit 50 is distinct with respect to the UPS device 1 and it is electrically connected to the UPS device 1 during installation.

However, in some embodiments of the invention, the back-up unit 50 may be physically integrated with the UPS device 1.

In general, the back-up unit 50 may be of any known type, according to the needs. In the following, it will be described in relation to the aspects relevant to the invention only, for the sake of brevity.

The UPS device 1 comprises a power conversion stage 13 electrically connectable with the first, second and third electric terminals 17, 18, 19.

The power conversion stage 13 is adapted to receive a power supply voltage $V_A$ from the power supply source 100 (when the UPS device operates in normal conditions) or a back-up voltage $V_B$ from the back-up unit 50 (when the UPS device operates in emergency conditions).

The power conversion stage 13 is further adapted to convert the power supply voltage $V_A$ or the back-up voltage $V_B$ into an adjustable load voltage $V_L$ to be provided to the electric loads 200.

Preferably, the power conversion stage 13 comprises conversion circuits 131 to carry out voltage conversion functionalities and switching means 133 to electrically connect with or disconnect from the electric load 200 and, possibly, with the power supply source 100.

Preferably, the power conversion stage 13 comprises control unit 132 to control the conversion circuits 131 and the switching means 133.

As an example, the conversion circuits 131 may include AC/DC, DC/DC and voltage conversion circuits arranged according to circuit solutions of known type.

The switching means 133 may include suitably arranged semiconductor switch elements (e.g. MOSFETs) of known type.

The control unit 132 may comprise suitable digital processing means (e.g. one or more microprocessors) configured to execute software instructions for carrying out the functionalities provided for said control unit.

In general, the power conversion stage 13 may be of any known type, according to the needs. In the following, it will be described in relation to the aspects relevant to the invention only, for the sake of brevity.

The UPS device 1 comprises an interface stage 10 to electrically couple or decouple the back-up unit 50 with or from the power conversion stage 13.

As shown in FIG. 1, the interface stage 10 is distinct respect to the power conversion stage 13. However, in some embodiments of the invention, the interface stage 10 and the power conversion stage 13 may be integrated in a single electronic board or electronic board portion.

The interface stage 10 comprises a switching circuit 11 electrically connected with the third electric terminals 19 of the UPS device and the power conversion stage 13.

The switching circuit 11 is adapted to reversibly switch in a conduction condition ON, at which it electrically connects the power conversion stage 13 with the third electric terminals 19, or in an interdiction condition OFF, at which it electrically disconnects the power conversion stage 13 from the third electric terminals 19.

Preferably, the switching circuit 11 comprises one or more semiconductor switch elements (e.g. MOSFETs) electrically connected in series with the electric terminals 19 of the UPS device and the power conversion stage 13 to interrupt or allow the flow of a back-up current $I_B$ between the third electric terminals 19 and the power conversion stage 13.

As the third electric terminals 19 are electrically connectable with the back-up unit 50, it is evident from the above that the switching circuit 11 is capable of interrupting or allowing the flow of a current $I_B$ between the back-up unit 50 and the power conversion stage 13.

The interface stage 10 further comprises a controller 12 operatively coupled with the switching circuit 11 and adapted to generate control signals CS to command said switching circuit to switch in the above-mentioned conduction or interdiction conditions ON, OFF.

The controller 12 may comprise one or more main digital processing devices (e.g. one or more microprocessors) configured to execute software instructions for carrying out its functionalities.

As shown in FIG. 1, the controller 12 is preferably arranged separately with respect to the power conversion stage 13 of the UPS device.

However, in some embodiments of the invention, the controller 12 may be part of the control unit 132 included in the power conversion stage 13 or be an additional control unit of the conversion stage 13 operatively coupled with the control unit 132.

Preferably, the interface stage 10 comprises a sensing circuit 14 operatively coupled with the controller 12.

The sensing circuit 14 is adapted to provide the controller 12 with detection signals DS indicative of the back-up voltage $V_B$ provided by the back-up unit 50 to the power conversion stage 13 (when said back-up unit 50 feeds the UPS device).

In other words, the sensing circuit 14 is adapted to provide detection signals DS indicative of the back-up voltage $V_B$ provided by the back-up unit 50 when this latter is electrically connected with the conversion stage 13, i.e. when the switching circuit 11 is in an ON condition.

Conveniently, the back-up voltage VB is detected downstream the switching circuit 11 (taking the indicated direction of the back-up current $I_B$ as a reference).

The sensing circuit 14 may comprise a resistive shunt arranged at the input of the power conversion 12, downstream the switching circuit 11. However, other voltage sensors of known type (e.g. of capacitive type) may be suitably used.

The general operation of the UPS device 1 is described in the following.

In normal operating conditions, the UPS device 1 is fed by the power supply source 100 and it feeds the electric load 200 with electric power derived from this latter.

The power conversion stage 13 receives a power supply voltage $V_A$ from the power supply source 100.

The power conversion stage 13 is electrically connected with the electric load 200 and it feeds this latter with an adjustable load voltage $V_L$ through the conversion circuits 131.

In emergency conditions, i.e. when the power supply source 100 is not available, the UPS device 1 is fed by the back-up unit 50 and it feeds the electric load 200 with electric power from this latter.

The power conversion stage 13 is electrically connected with the back-up unit 50 through the switching circuit 11 and it receives a power supply voltage $V_B$ from said back-up unit.

The power conversion stage 13 is electrically connected with the electric load 200 and it feeds this latter with an adjustable load voltage $V_L$ through the conversion circuits 131.

When the power supply voltage $V_B$ becomes too low (i.e. it is lower than a predefined threshold value $V_{TH0}$) due to the discharge of the batteries 51 of the back-up unit 50, the control unit 132 commands the switching means 133 to electrically disconnect the power conversion stage 13 from the electric load 200.

Concurrently, the controller 12 commands the switching circuit 11 to electrically disconnect the power conversion stage 13 from the back-up unit 50.

The UPS device 1 is thus electrically disconnected from the electric load 200 and from the back-up unit 50 and it stops operating.

A maintenance intervention on the back-unit 50 is needed to replace the old batteries 51 of the back-unit with new batteries 51B.

If such a maintenance operation is successful, the UPS device 1 restarts operating in emergency conditions until the new batteries 51B are sufficiently charged or the power supply source 100 becomes available. In this last case, the UPS device 1 starts operating in normal conditions.

As it is possible to notice from the above, in general, the operation of the UPS device 1 is somehow similar to that one of solutions of known type.

An important aspect of the UPS device 1, however, consists in that interface device 10 is provided with a technical solution that allows checking whether the back-up unit 50 is capable of providing a back-up voltage $V_B$ adequate to suitably feed the UPS device.

Such a checking activity is carried out during a transient time interval T (FIG. 5) following the replacement of the batteries 51 of the back-unit 50 with new batteries 51B, According to the invention, the interface stage 10 comprises a feeding circuit 15 electrically connected with the third electric terminals 19 of the UPS device and the controller 12.

The feeding circuit 15 is adapted to temporary feed the controller 12 with a first feeding voltage $V_{F1}$ during the transient time interval T following the replacement of the batteries 51 of the back-up unit 50 with new batteries 51B, upon a maintenance intervention on the back-up unit (FIG. 2).

During the transient time interval T (which may last some hundreds of ms), the controller 12 is adapted to execute suitable predetermined checking activities (namely a checking procedure 30). Such checking activities are directed to check whether the new batteries 51B of the back-up unit 50 are sufficiently charged and, consequently, to check whether the back-up unit 50 is capable of providing a back-up voltage $V_B$ adequate to feed the UPS device (in particular the power conversion stage 13) in emergency conditions.

If said checking activities provide a positive outcome (the back-up voltage $V_B$ is sufficiently high, which means that the batteries 51 are sufficiently charged), the controller 12 enables the power conversion stage 13 to operate with the back-up voltage $V_B$ provided by the back-up unit 50. The UPS device can thus re-start operating at least in emergency conditions.

If said checking activities provide a negative outcome (the back-up voltage $V_B$ is too low, which means that the batteries 51 are not sufficiently charged), the controller 12 causes the electrical disconnection of the power conversion stage 13 from the back-up unit 50. in this case, the controller 12 switches off at the end of the transient time interval T, thus preventing any further discharging of the batteries 51B.

Preferably, the feeding circuit 15 provides the first feeding voltage $V_{F1}$ to the controller 12 in response to receiving a start-up voltage variation $\Delta V_B$ of the back-up voltage $V_B$ at the third electric terminals 19 upon the replacement of the batteries 51 with new batteries 51B for the back-unit 50 is carried out.

The start-up voltage variation $\Delta V_B$ (which generally has the waveform of a voltage step) is the positive variation (or rising edge) of the back-up voltage $V_B$, which is generated at the third electric terminals 19 when the new batteries 51B are inserted in the corresponding slot 52 of the back-unit 50 and they electrically connect with the third electric terminals 19 through the output electric terminals 53 of the back-unit 50.

Referring to FIG. 3, the feeding circuit 15 preferably comprises a derivative circuit block 151 electrically connected with the third electric terminals 19.

The derivative circuit block 151 is adapted to receive in input the start-up voltage variation $\Delta V_B$ of the back-up voltage $V_B$ and provide in output a charging current $I_{CH}$ in response to said start-up voltage variation.

The derivative circuit block 151 may be realised in practice according to known solutions of the state of the art. For example, it may include one or more operational amplifiers operatively coupled with suitably arranged RC polarization networks.

It is evident that the derivative circuit block 151 will provide a substantially null charging current $I_{CH}$ when the back-up voltage $V_B$ reaches a steady-state value after the start-up voltage variation $\Delta V_B$.

Preferably, the feeding circuit 15 comprises a storage circuit block 152 of capacitive type electrically connected in cascade with the derivative circuit block 151.

The storage circuit block 152 is adapted to receive in input the charging current $I_{CH}$ and provide in output a charging voltage $V_{CH}$ in response to said charging current.

The storage circuit block 152 may be realised in practice according to known solutions of the state of the art. For example, it may include one or more storage capacitors electrically connected in parallel with the output terminals of the derivative circuit block 151.

Preferably, the feeding circuit 15 comprises a regulation circuit block 153 electrically connected in cascade with the storage circuit block 152.

The regulation circuit block 153 is adapted to receive in input the charging voltage $V_{CH}$ and to provide in output the first feeding voltage $V_{F1}$ in response to said charging voltage.

The regulation circuit block 153 may be realised in practice according to known solutions of the state of the art. For example, it may include one or more LDO regulation circuits electrically connected in parallel with the output terminals of the storage circuit block 152.

As mentioned above, the controller 12 is adapted to automatically execute a checking procedure 30 in response to receiving the first feeding voltage $F_1$ provided by the feeding circuit 15.

The checking procedure 30 is conveniently directed to check whether the new batteries 51B of the back-up unit 50, which have been used to replace the old batteries 51 of the back-up unit 50, are adequately charged. In this way, the back-up unit 50 is able to provide a suitable back-up voltage $V_B$ to the UPS device (more particularly to the power conversion stage 13).

According to a preferred embodiment of the invention, the checking procedure 30 comprises the sequence of steps illustrated in FIG. 4.

Initially, the checking procedure 30 comprises a step 31, in which the controller 12 commands the switching circuit 11 to switch in a conduction condition ON.

In practice, initially, the checking procedure 30 provides for electrically connecting the back-up unit 50 to the power conversion stage 13 as these electronic arrangements are necessarily electrically disconnected from the back-unit 50 during the maintenance intervention on the back-up up unit 50. In this way, the back-unit 50 can start feeding the power conversion stage 13 with the back-up voltage $V_B$ made available by the new batteries 51B at the third electric terminals 19 of the UPS device.

Subsequently, the checking procedure 30 comprises a step 32, in which the controller 12 determines whether the back-up voltage $V_B$ provided by the back-up unit 50 (with the new batteries 51B) is adequate for feeding the power conversion stage 13 in emergency conditions. Conveniently, the step 32 of the checking procedure 30 is carried out by comparing the back-up voltage $V_B$ provided by the back-up unit 50 with a pre-set threshold voltage value $V_{TH}$.

The threshold value $V_{TH}$ (which is generally different from the above-mentioned threshold value $V_{TH0}$) is conveniently selected to be indicative of charge level of the batteries 51B, which ensures the feeding of the UPS device for a relatively long time (e.g. some weeks or months). In this way, a satisfactory continuity of service of the UPS device in emergency conditions may be obtained.

Preferably, the step 32 of the checking procedure 30 comprises a step 321 of receiving and processing the detection signals DS indicative of the back-up voltage $V_B$.

The detection signals DS are conveniently provided to the controller 12 by the sensing circuit 14 of the interface stage 10 and they are suitably processed by the controller 12 to obtain a detected value of the behaviour the back-up voltage $V_B$ at a given sampling instant.

Preferably, the step 32 of the checking procedure 30 comprises a step 322 of comparing the detected value of the back-up voltage $V_B$ with the predefined threshold voltage value $V_{TH}$.

Preferably, the step 32 of the checking procedure 30 comprises:
a step 323 of determining that the back-up voltage $V_B$ provided by the back-up unit 50 is adequate for feeding the power conversion stage 13 (in emergency conditions), if the detected value of the back-up voltage $V_B$ is higher than or equal to said threshold value $V_{TH}$;
a step 324 of determining that the back-up voltage $V_B$ provided by the back-up unit 50 is not adequate for feeding the power conversion stage 13 (in emergency conditions), if the detected value of the back-up voltage $V_B$ is lower than the threshold value $V_{TH}$.

The determination that the back-up voltage $V_B$ provided by the back-up unit 50 is adequate for feeding the power conversion stage 13 means that the new batteries 51B, which have been used to replace the old batteries 51 during a maintenance intervention on the back-up unit 50, are determined as sufficiently charged to ensure a suitable operation of the UPS device.

Therefore, the controller 12 is adapted command the switching circuit 11 (by providing suitable control signals CS to said switching circuit) to hold the conduction condition ON, if the back-up voltage $V_B$ provided by the back-up unit 50 is determined as adequate for feeding the power conversion stage 13.

The back-up unit 50 can thus keep on feeding the power conversion stage 13 with the back-up voltage $V_B$ made available by the new batteries 51B and the operation of the UPS device can suitably restart (in emergency conditions).

In this case, since the time interval T is destined to expire quickly (after some hundreds of ms) and the feeding circuit 15 would not able to provide a suitable feeding voltage to the controller 12 anymore, the power conversion stage 13 provides a second feeding voltage $V_{F2}$ to the controller 12 in substitution of the first feeding voltage $V_{F1}$. In this way, the controller 12 can keep on operating even when the first feeding voltage is no more available at the end of the time interval T.

Instead, the determination that the back-up voltage $V_B$ provided by the back-up unit 50 is not adequate for feeding the power conversion stage 13 means that the new batteries 51B, which have been used to replace the old batteries 51 during a maintenance intervention on the back-up unit 50, are not sufficiently charged to ensure a suitable operation of the UPS device.

Therefore, the controller 12 is adapted to command the switching circuit 11 (by providing suitable control signals CS to said switching circuit) to switch in the interdiction condition OFF, if the back-up voltage $V_B$ provided by the back-up unit 50 is determined as not adequate for feeding the power conversion stage 13.

The back-up unit 50 is thus electrically disconnected from the power conversion stage 13 and the operation of the UPS device cannot restart (neither in emergency conditions).

In this way, since the feeding circuit 15 is not able to provide a suitable feeding voltage to the controller 10 after the expiration of the above-mentioned transient time interval T (after some hundreds of ms), the flow of discharging currents from the batteries 51B of the back-up unit is substantially prevented. The batteries 51B can maintain their charge for a prolonged time without falling in a deep-discharge condition.

The operation of the UPS device 1 at a maintenance intervention on the back-up unit 50 (in which old batteries 51 are replaced with new batteries 51B) is now described in more details referring to FIGS. 5 and 6.

When the maintenance intervention on the back-up unit 50 is carried out, the UPS device 1 does not operate and it is electrically disconnected from the back-up unit 50 (and from the electric load 100).

When the new batteries 51B are inserted in the corresponding slot 52 of the back-unit 50 and electrically connect with the third electric terminals 19, a start-up voltage variation $\Delta V_B$ of the back-up voltage $V_B$ arises at said third electric terminals (FIGS. 5, 6—instant $t_1$).

In response to the start-up voltage variation $\Delta V_B$ at the third terminals 19, the feeding circuit 15 provide a feeding voltage $V_{F1}$ to the controller 12.

As schematically shown in FIGS. 5-6, the feeding voltage $V_{F1}$ has the waveform of a voltage pulse having a duration substantially corresponding to a transient time interval T, e.g. few hundreds of ms.

The duration of the transient time interval T may depend on the actual charging status of the new batteries 51B and on the circuit arrangements chosen for the feeding circuit 15 (in particular the storage circuit block 152).

In general, since the feeding circuit 15 comprises a derivative circuit block 151, the transient time interval T will end when the back-up voltage $V_B$ reaches a steady-state value after the initial start-up voltage variation $\Delta V_B$.

During the transient time interval T, a current pulse $I_{F1}$ feeds the controller 12. In principle, the area of such a current pulse represents the electric energy exploited by the controller 12 to operate in transient conditions (i.e. during the transient time interval T).

In response to receiving the feeding voltage $V_{F1}$, the controller 12 automatically executes the checking procedure 30 to check whether the new batteries 51B of the back-up unit 50 are adequately charged.

At the step 31 of the checking procedure 30, the controller 12 commands the switching circuit 11 to electrically connect the third terminals 19 (and consequently the back-up unit 50) with the power conversion stage 13 (FIGS. 5, 6—instant torr). In this way, a back-up current $I_B$ starts flowing towards the power conversion stage 13.

At the step 32 of the checking procedure 30, the controller 12 determines whether the back-up voltage $V_B$ provided by the back-up unit 50 is adequate for feeding the power conversion stage 13 by comparing a detected voltage value of said back-up voltage (which is provided by the sensing circuit 14) with a threshold value $V_{TH}$.

If the detected value of the back-up voltage $V_B$ is lower than the threshold value $V_{TH}$ (FIG. 5), the controller 12 determines that the back-up voltage $V_B$ provided by the back-up unit 50 is not adequate for feeding the power conversion stage 13 (even in emergency conditions).

In this case, the controller 12 commands the switching circuit 11 to switch in the interdiction condition OFF (FIG. 5—instant torr).

The back-up unit 50 is again electrically disconnected from the power conversion stage 13, the back-up current $I_B$ to the power conversion stage 13 is interrupted and the UPS device 1 does not start operating.

It is noted that no currents flow towards the power conversion stage 13 and the controller 12 after the expiration of the transient time interval T. In this way, the batteries 51B of the back-up unit 50 are not further discharged by undesired discharging currents.

If the detected value of the back-up voltage $V_B$ is higher than or equal to the threshold value VIE (FIG. 6), the controller 12 determines that the back-up voltage $V_B$ provided by the back-up unit 50 is adequate for feeding the power conversion stage 13 (even in emergency conditions).

In this case, the controller 12 commands the switching circuit 11 to hold the conduction condition ON (FIG. 6).

The back-up unit 50 remains electrically connected from the power conversion stage 13 and the back-up current $I_B$ keep on rising up to reaching a steady-state value $I_{B0}$, which basically depends on the equivalent impedance offered by the power conversion stage 13 (FIG. 6).

The power conversion stage 13 provides a second feeding voltage $V_{F2}$ to the controller 12 in such a way that this latter is able to keep on operating after the expiration of the transient time interval T, when the first feeding voltage $V_{F1}$ is no more available.

As it is suitably fed by the back-unit 50, the power conversion stage 13 electrically connects with the electric load 200 and the UPS device 1 starts operating again in emergency conditions until the new batteries 51B are sufficiently charged or the power supply source 100 becomes available. In this last case, the UPS device 1 starts operating in normal conditions.

The UPS device 1, according to the present invention, provides remarkable advantages with respect to the solutions of the state of the art.

Since it is configured to feed the controller 12 during a transient time interval T only, the feeding circuit 15 included in the UPS device 1 does not cause an useless discharge of the batteries 51, when the UPS device does not operate.

On the other hand, when the replacement of the batteries 51 is carried out, such the feeding circuit 15 puts the controller 12 in condition to carry out checking activities, which allow a user to immediately receive a feedback on the actual charging status of the replacement batteries 51B used in the maintenance intervention.

If the charging status of the replacement batteries 51B is satisfactory (the back-up voltage $V_B$ is sufficiently high), the UPS device 1 immediately restarts operating (in emergency conditions).

If the charging status of the replacement batteries 51B is not satisfactory (the back-up voltage $V_B$ is too low), the UPS device 1 does not restart operating at all.

The user can thus provide for carrying out a further replacement of the batteries of the back-up unit 50, if this is possible. In any case, the user can receive information on whether the replacement operation was/was not successful.

The UPS device 1 allows efficiently managing the maintenance interventions on the back-up unit 50 preventive an excessive discharge of the batteries 51 of this latter.

The UPS device 1 is easy and cheap to manufacture at industrial levels with respect to the solutions currently available in the state of the art.

The UPS device 1 is particularly suitable for use in outdoor MV electric installations (e.g. in outdoor MV switching apparatuses, such as outdoor MV reclosers).

The invention claimed is:

1. A UPS device for electric power distribution installations, the UPS device comprising:
 first electric terminals for electrical connection with an electric load to be fed by the UPS device;
 second electric terminals for electrical connection with a power supply source adapted to feed the UPS device;
 third electric terminals for electrical connection with a back-up unit adapted to feed the UPS device, when the power supply source is not available, the back-up unit having one or more replaceable batteries;
 a power conversion stage electrically connectable with the first, second and third electric terminals, the power conversion stage being adapted to receive a power supply voltage from the power supply source or a back-up voltage from the back-up unit, when the power supply source is not available, and being adapted to provide an adjustable load voltage to the electric load; and an interface stage to electrically couple or decouple the back-up unit with or from the power conversion stage, the interface stage comprising:

a switching circuit electrically connected with the third electric terminals and the power conversion stage, the switching circuit being adapted to reversibly switch between a conduction condition, at which the switching circuit electrically connects the power conversion stage with the third electric terminals, and an interdiction condition, at which the switching circuit electrically disconnects the power conversion stage from the third electric terminals; and a controller operatively coupled with the switching circuit and adapted to command the switching circuit to switch in the conduction condition or the interdiction condition;

wherein the interface stage comprises a feeding circuit electrically connected with the third electric terminals and the controller;

wherein the feeding circuit is adapted to temporary feed the controller with a first feeding voltage during a transient time interval following after a time period for replacement of the one or more replaceable batteries of the back-up unit with a new replaceable battery during a maintenance intervention on the back-up unit; and wherein, in response to the first feeding voltage, the controller is adapted to carry out a checking procedure to check whether the new replaceable battery of the back-up unit are sufficiently charged to feed the UPS device.

2. The UPS device, according to claim 1, wherein the feeding circuit provides the first feeding voltage to the controller in response to receiving a start-up voltage variation of the back-up voltage at the third electric terminals, the start-up voltage variation being generated upon the electrical connection of the new replaceable battery of the back-up unit with the third electric terminals.

3. The UPS device, according to claim 2, wherein the feeding circuit comprises a derivative circuit block electrically connected with the third electric terminals, the derivative circuit block being adapted to receive the start-up voltage variation and provide a charging current in response to the start-up voltage variation.

4. The UPS device, according to claim 3, wherein the feeding circuit comprises a storage circuit block of capacitive type electrically connected in cascade with the derivative circuit block, the storage circuit block being adapted to receive the charging current and provide a charging voltage in response to the charging current.

5. The UPS device, according to claim 4, wherein the feeding circuit comprises a regulation circuit block electrically connected in cascade with the charging voltage and provide the first feeding voltage in response to the charging voltage.

6. The UPS device, according to claim 1, wherein the checking procedure comprises:

commanding the switching circuit to switch in the conduction condition; and determining whether the back-up voltage provided by the back-up unit is adequate for feeding the power conversion stage.

7. The UPS device, according to claim 6, wherein the controller is adapted to command the switching circuit to hold the conduction condition, when the back-up voltage is adequate for feeding the power conversion stage.

8. The UPS device, according to claim 7, wherein the power conversion stage is adapted to provide a second feeding voltage to the controller in substitution of the first feeding voltage, when the controller commands the switching circuit to hold the conduction condition upon determining whether the back-up voltage is adequate for feeding the power conversion stage.

9. The UPS device, according to claim 6, wherein the controller is adapted to command the switching circuit to switch in the interdiction condition, when the back-up voltage is not adequate for feeding the power conversion stage.

10. The UPS device, according to claim 1, further comprising a sensing circuit adapted to provide the controller with detection signals indicative of the back-up voltage provided by the back-up unit to the power conversion stage.

11. The UPS device, according to claim 6, wherein determining whether the back-up voltage provided by the back-up unit is adequate for feeding the power conversion stage comprises:

receiving and processing detection signals indicative of the back-up voltage provided by the back-up unit;

comparing a detected value of the back-up voltage provided by the back-up unit with a predefined threshold value; and determining that the back-up voltage provided by the back-up unit is adequate for feeding the power conversion stage, when the detected value of the back-up voltage is higher than or equal to the predefined threshold value; or determining that the back-up voltage provided by the back-up unit is not adequate for feeding the power conversion stage, when the detected value of the back-up voltage is lower than threshold value.

12. An electric power distribution installation comprising the UPS device, according to claim 1.

13. The electric power distribution installation, according to claim 12, wherein the electric power distribution installation is of an outdoor type.

14. The UPS device, according to claim 7, wherein the controller is adapted to command the switching circuit to switch in the interdiction condition, when the back-up voltage is not adequate for feeding the power conversion stage.

15. The UPS device, according to claim 8, wherein the controller is adapted to command the switching circuit to switch in the interdiction condition, when the back-up voltage is not adequate for feeding the power conversion stage.

16. The UPS device, according to claim 5, wherein the checking procedure comprises:

commanding the switching circuit to switch in the conduction condition; and determining whether the back-up voltage provided by the back-up unit is adequate for feeding the power conversion stage.

17. The UPS device, according to claim 16, wherein the controller is adapted to command the switching circuit to hold the conduction condition, when the back-up voltage is adequate for feeding the power conversion stage.

18. The UPS device, according to claim 17, wherein the power conversion stage is adapted to provide a second feeding voltage to the controller in substitution of the first feeding voltage, when the controller commands the switching circuit to hold the conduction condition upon determining whether the back-up voltage is adequate for feeding the power conversion stage.

19. The UPS device, according to claim 18, wherein the controller is adapted to command the switching circuit to switch in the interdiction condition, when the back-up voltage is not adequate for feeding the power conversion stage.

20. The UPS device, according to claim 5, further comprising a sensing circuit adapted to provide the controller with detection signals indicative of the back-up voltage provided by the back-up unit to the power conversion stage.

* * * * *